US012576890B2

(12) United States Patent
Cho

(10) Patent No.: US 12,576,890 B2
(45) Date of Patent: Mar. 17, 2026

(54) YIELDING SYSTEM FOR EMERGENCY VEHICLES AND CONTROL METHOD THEREFOR

(71) Applicant: HYUNDAI MOBIS Co., Ltd., Seoul (KR)

(72) Inventor: Chang Ho Cho, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 69 days.

(21) Appl. No.: 17/586,309

(22) Filed: Jan. 27, 2022

(65) Prior Publication Data

US 2022/0242459 A1     Aug. 4, 2022

(30) Foreign Application Priority Data

Feb. 1, 2021     (KR) .......................... 10-2021-0014043

(51) Int. Cl.
B60W 60/00          (2020.01)
G08G 1/09           (2006.01)

(52) U.S. Cl.
CPC ... B60W 60/00276 (2020.02); B60W 2520/04 (2013.01); B60W 2540/215 (2020.02); B60W 2554/402 (2020.02); B60W 2554/4041 (2020.02); B60W 2554/4044 (2020.02); B60W 2554/4046 (2020.02); B60W 2554/801 (2020.02); B60W 2554/802 (2020.02); B60W 2555/60 (2020.02); G08G 1/09 (2013.01)

(58) Field of Classification Search
CPC ...... B60W 60/00276; B60W 30/18159; G08G 1/0965; B60Y 2300/18158
See application file for complete search history.

(56) References Cited

U.S. PATENT DOCUMENTS

| | | | | |
|---|---|---|---|---|
| 2018/0334161 | A1* | 11/2018 | Mizuno | ................. B60W 30/00 |
| 2019/0302781 | A1* | 10/2019 | Tao | ...................... G05D 1/0214 |
| 2020/0377101 | A1* | 12/2020 | Parasuram | ........ B60W 30/0956 |
| 2021/0034914 | A1* | 2/2021 | Bansal | ................... G06V 20/58 |
| 2021/0107476 | A1* | 4/2021 | Cui | ................. B60W 60/00276 |

(Continued)

FOREIGN PATENT DOCUMENTS

| | | |
|---|---|---|
| JP | 2018-195202 A | 12/2018 |
| KR | 10-2019-0041781 A | 4/2019 |

OTHER PUBLICATIONS

Office Action issued corresponding Korean Patent Application No. 10-2021-0014043 issued Aug. 25, 2025, with English translation.

(Continued)

*Primary Examiner* — Jelani A Smith
*Assistant Examiner* — Toya Pettiegrew
(74) *Attorney, Agent, or Firm* — MORGAN, LEWIS & BOCKIUS LLP

(57)          ABSTRACT

A method for controlling a subject vehicle includes detecting an emergency vehicle located around the subject vehicle while the subject vehicle waiting for a traffic signal inside a stop line at an intersection, determining, based on a location of the emergency vehicle, that the subject vehicle needs to yield way to the emergency vehicle, checking a signal system through moving patterns of preceding vehicles, collecting lane entry routes of vehicles, determining a free zone outside the stop line by analyzing the entry routes of vehicles, and causing the subject vehicle to travel to the determined free zone.

10 Claims, 2 Drawing Sheets

(56)                  References Cited

U.S. PATENT DOCUMENTS

| | | | | |
|---|---|---|---|---|
| 2021/0253128 | A1* | 8/2021 | Nister | .................... G05D 1/646 |
| 2022/0396262 | A1* | 12/2022 | Totzke | ................. B60W 50/14 |

OTHER PUBLICATIONS

Jong-won Kim, "The Full Story Behind the 'Fined for Yielding to an Ambulance' Incident", SBS News, https://news.sbs.co.kr/news/endPage.do?news_id=N1002802780, Jan. 26, 2015, 13 pages.

* cited by examiner

YIELDING SYSTEM FOR EMERGENCY VEHICLES AND CONTROL METHOD THEREFOR

CROSS-REFERENCE TO RELATED APPLICATION

This application claims the benefit of Korean Patent Application No. 10-2021-0014043, filed on Feb. 1, 2021 in the Korean Intellectual Property Office, the disclosure of which is incorporated herein by reference.

BACKGROUND OF THE INVENTION

1. Field of the Invention

The present invention relates to an autonomous driving system for vehicles to help an emergency vehicle smoothly perform a purpose thereof by moving a user's vehicle out of a stop line.

2. Description of the Related Art

When an emergency vehicle for transporting an emergency patient is located adjacent to vehicles, all vehicles are obliged to yield so that the emergency vehicle can pass first. In order to yield way to an emergency vehicle, there may be cases where it is unavoidable to drive a vehicle outside a stop line. In this case, a user must carefully move the user's vehicle outside a stop line because there is always a risk of colliding with a vehicle traveling in another lane at an intersection.

The matters described as the background art above are only for improving the understanding of the background of the present invention and should not be taken as acknowledging that they correspond to the prior art already known to those skilled in the art.

SUMMARY OF THE INVENTION

Therefore, the present invention has been made in view of the above problems, and it is an object of the present invention to provide an autonomous driving system capable of causing a user's vehicle to travel outside a stop line of an intersection when an emergency vehicle following the user's vehicle is recognized while the user's vehicle stops inside the stop line, to thereby yield way to the emergency vehicle.

In accordance with the present invention, the above and other objects can be accomplished by the provision of a method for controlling a subject vehicle, including, detecting an emergency vehicle located around the subject vehicle while the subject vehicle waiting for a traffic signal inside a stop line at an intersection, determining, based on a location of the emergency vehicle, that the subject vehicle needs to yield way to the emergency vehicle, checking a signal system through moving patterns of preceding vehicles, collecting lane entry routes of vehicles, determining a free zone outside the stop line by analyzing the entry routes of vehicles, and causing the subject vehicle to travel to the determined free zone.

The detecting of the emergency vehicle may be based on one or more of whether a vehicle surrounding the user's vehicle sounds a siren, whether a surrounding vehicle turns on a flashing light, and whether a surrounding vehicle honks a horn thereof.

The collecting of the entry routes may include collecting lane entry trajectories of vehicles turning left in front of the subject vehicle.

The determining of the free zone may include determining a space between an area outside the stop line where the subject vehicle is stopped and an area that does not interfere with driving of other vehicles as the free zone based on the collected entry routes.

The causing of the subject vehicle to travel may include causing the subject vehicle to the free zone only when a user who is riding in the subject vehicle agrees to drive the subject vehicle to the free zone.

In accordance with another aspect of the present invention, there is provided a yielding system for controlling a subject vehicle, including a sensor provided in the subject vehicle and configured to detect an emergency vehicle located around the subject vehicle, to check a signal system through moving patterns of preceding vehicles, and to collect entry routes of vehicles preceding the subject vehicle, and a controller configured to determine a free zone outside a stop line by analyzing the entry routes of vehicles in front of the subject vehicle and to cause the subject vehicle to travel to the determined free zone.

The sensor may detect the emergency vehicle based on one or more of whether a vehicle surrounding the subject vehicle sounds a siren, whether a surrounding vehicle turns on a flashing light, and whether a surrounding vehicle honks a horn thereof.

The sensor may collect lane entry trajectories of vehicles turning left in front of the subject vehicle.

The controller may determine a space between an area outside the stop line where the subject vehicle is stopped and an area that does not interfere with driving of other vehicles as the free zone based on the collected entry routes.

The controller may cause the subject vehicle to travel to the free zone only when a user who is riding in the subject vehicle agrees to drive the subject vehicle to the free zone.

According to the yielding system for emergency vehicles and the control method therefor of the present invention, a user's vehicle can safely travel outside a stop line without colliding with other forward-running vehicles and stop, thereby helping an emergency vehicle smoothly perform a purpose thereof.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, the present invention will be described in detail.

Article 29 of the Road Traffic Act stipulates the priority of emergency vehicles, and in particular, Section 5 stipulates that "drivers of all cars and streetcars must yield so that an emergency vehicle can pass first when the emergency vehicle approaches at places other than those under Section 4". All vehicles on roads are obligated to yield way to emergency vehicles such that the emergency vehicles can pass first.

However, if a vehicle is moved outside a stop line at an intersection to yield way to an emergency vehicle, there is a risk of colliding with a vehicle traveling in another lane, and thus the user of the vehicle must move the vehicle carefully and should take care not to interfere with traveling of other vehicles.

A method for controlling a yielding system for emergency vehicles according to the present invention is a method for allowing an autonomous vehicle to safely and rapidly yield way to an emergency vehicle in a situation where the autonomous vehicle needs to yield way to the emergency vehicle while waiting for a traffic signal inside a stop line at an intersection.

Figure 2:
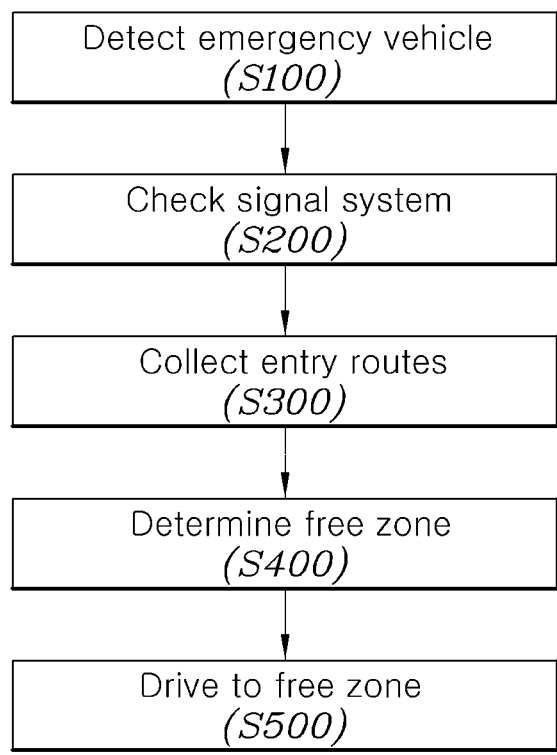
FIG. 2 is a flowchart illustrating a method for controlling a yielding system for emergency vehicles according to the present invention.

FIG. 2 is a flowchart illustrating the method for controlling the yielding system for emergency vehicles according to the present invention, and the present invention includes a step (S100) of detecting an emergency vehicle located around a user's vehicle, a step (S200) of checking a signal system through moving patterns of vehicles preceding the user's vehicle, a step (S300) of collecting lane entry routes of vehicles, a step (S400) of determining a free zone outside a stop line by analyzing entry routes of vehicles, and a step (S500) of driving the user's vehicle to the determined free zone.

Specifically, a sensor unit provided in the user's vehicle detects an emergency vehicle from among surrounding vehicles, and when an emergency vehicle is detected, a signal system is checked through routes of preceding vehicles beyond a stop line to confirm lanes in which vehicles are traveling and how the vehicles are traveling. Upon checking the signal system, routes of vehicles that are traveling are collected through the signal system, and a control unit analyzes the collected routes and sets a free zone outside the stop line, which can be used to yield way to the emergency vehicle. Thereafter, the control unit causes the user's vehicle to travel to the free zone such that the user's vehicle does not collide with and interfere with preceding vehicles to help the emergency vehicle smoothly execute the purpose thereof.

Specifically, the step (S200) of detecting an emergency vehicle may be a step of detecting an emergency vehicle based on any one or more of whether a vehicle surrounding the user's vehicle sounds a siren, whether a surrounding vehicle turns on a flashing light, and whether a surrounding vehicle honks a horn thereof.

The sensor unit provided in the user's vehicle may detect an emergency vehicle based on any one or more of whether a vehicle surrounding the user's vehicle sounds a siren, whether a surrounding vehicle turns on a red or green flashing light, and whether a surrounding vehicle repeatedly honks a horn thereof. Since installation of a siren and installation of a red or green flashing light are mandatory for emergency vehicles, an emergency vehicle can be detected from the operation of such devices. In addition, when a vehicle repeatedly honks a horn thereof, the vehicle can be detected as an emergency vehicle.

When an emergency vehicle is detected and the proximity of the emergency vehicle to the user's vehicle is recognized, lane entry routes of vehicles are collected. The step (S300) of collecting lane entry routes of vehicles may be a step of collecting lane entry trajectories of vehicles turning left in front of the user's vehicle.

Figure 1:
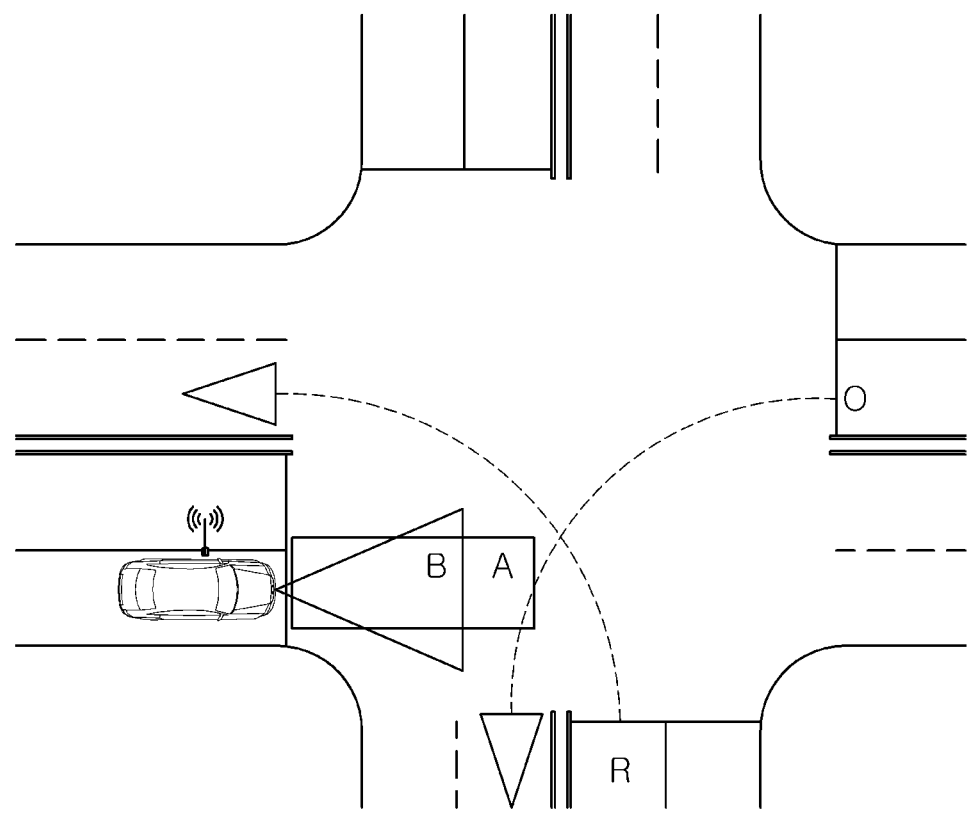
FIG. 1 illustrates a situation in which a vehicle stops at an intersection for better understanding of the present invention.

Referring to FIG. 1, it can be ascertained that the user's vehicle should pay attention to a vehicle turning left in a front opposite lane and a vehicle turning left in a front right lane outside an intersection stop line. The sensor unit provided in the user's vehicle collects entry trajectories of vehicles turning left in a confirmed signal system and transmits the same to the control unit.

The step (S400) of determining a free zone may be a step of determining, as a free zone, a space between an area outside the stop line where the user's vehicle is stopped and an area that does not interfere with traveling of other vehicles based on collected entry routes.

Specifically, the control unit provided in the vehicle may determine a free zone through a lane entry route of a preceding vehicle, received from the sensor unit. Referring to FIG. 1, if the signal system is constructed such that vehicles can turn left in the opposite lane (O) in front of the user's vehicle, the control unit can determine an area B as a free zone by analyzing entry routes of vehicles turning left. If the signal system is constructed such that vehicles can turn left in the right lane (R) of the user's vehicle, the control unit may determine an area A as a free zone by analyzing entry routes of vehicles turning left.

After the free zone is determined by the controller, the vehicle is driven. The step (S500) of driving the vehicle may be a step of driving the user's vehicle to the free zone only when the user who is riding in the user's vehicle agrees that the user's vehicle travels to the free zone.

Specifically, the control unit of the user's vehicle may ask for consent from the user to drive to the free zone through a controller that may be installed inside the user's vehicle, and only when the user agrees to drive the vehicle to the free zone, cause the user's vehicle to travel to the free zone. If there is a better free zone determined by the user, the user may not agree to drive to the free zone. In this case, the user can personally control the user's vehicle to yield way to the emergency vehicle.

The yielding system for emergency vehicles according to the present invention to achieve the above-described object includes a sensor unit that is provided in a user's vehicle, detects an emergency vehicle located around the user's vehicle, checks a signal system through moving patterns of preceding vehicles, and collects entry routes of vehicles preceding the user's vehicle, and a control unit that determines a free zone outside a stop line by analyzing entry routes of vehicles preceding the user's vehicle and causing the user's vehicle to travel to the determined free zone.

The sensor unit may detect an emergency vehicle based on any one or more of whether a vehicle surrounding the user's vehicle sounds a siren, whether a surrounding vehicle turns on a flashing light, and whether a surrounding vehicle honks a horn thereof.

The sensor unit may collect a lane entry trajectory of a vehicle turning left in front of the user's vehicle.

The control unit may determine, as a free zone, a space between an area outside a stop line where the user's vehicle is stopped and an area that does not interfere with driving of other vehicles based on entry routes collected by the sensor unit.

The control unit may control the user's vehicle to travel to the free zone only when the user riding in the user's vehicle agrees to drive to the free zone.

The operations of the methods or algorithm described in connection with the embodiments disclosed herein may be embodied in hardware or a software module executed by a processor or in a combination thereof. The software module may reside on a non-transitory computer-readable storage medium (i.e., a memory and/or a storage) such as a RAM, a flash memory, a ROM, an EPROM, an EEPROM, a register, a hard disk, a removable disk, and a CD-ROM. In one example, the above-described apparatus for updating a controller for a mobility device may include a processor which is configured to perform the above-described operations when executing the software module stored in the storage medium. In one example, the above-described yielding system may include a processor which is configured to perform the corresponding operations when executing the software module stored in the storage medium. In one example, the above-described control unit (or controller) may include a processor which is configured to perform the corresponding operations when executing the software module stored in the storage medium.

Although specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a subject vehicle, comprising:

detecting, by a sensor, an emergency vehicle following the subject vehicle while the subject vehicle waiting for a traffic signal before a stop line of a first road at an intersection where the first road and a second road intersect each other;

determining, by the sensor and based on a location of the emergency vehicle, that the subject vehicle needs to yield way to the emergency vehicle;

checking, by the sensor, a signal system through moving patterns of preceding vehicles crossing the intersection;

collecting, by the sensor, lane entry routes of vehicles crossing the intersection;

determining, by a controller, a free zone disposed inside the intersection, by analyzing the entry routes of vehicles, wherein the free zone is an area disposed inside the intersection and not interfering with driving of vehicles crossing the intersection;

asking, by the controller, for consent from a user who is riding in the subject vehicle whether to allow the subject vehicle to drive the free zone; and upon the user's consent, causing, by the controller, the subject vehicle to autonomously pass the stop line to stop at the determined free zone, so as to allow the emergency vehicle to pass and not to interfere with vehicles crossing the intersection.

2. The method according to claim 1, wherein the detecting of the emergency vehicle is based on one or more of whether a vehicle surrounding the subject vehicle sounds a siren, whether a surrounding vehicle turns on a flashing light, and whether a surrounding vehicle honks a horn thereof.

3. The method according to claim 1, wherein the collecting of the entry routes comprises collecting lane entry trajectories of vehicles turning left in front of the subject vehicle.

4. The method according to claim 1, wherein the determining of the free zone comprises determining a space between an area outside the stop line where the subject vehicle is stopped and the area that does not interfere with the driving of the vehicles crossing the intersection as the free zone based on the collected entry routes.

5. The method according to claim 1, wherein the causing of the subject vehicle to travel to the free zone is performed only when the user agrees.

6. A yielding system for controlling a subject vehicle, comprising:

a sensor provided in the subject vehicle and configured to, while the subject vehicle waiting for a traffic signal before a stop line of a first road at an intersection where the first road and a second road intersect each other, detect an emergency vehicle following the subject vehicle, to check a signal system through moving patterns of preceding vehicles, and to collect entry routes of vehicles crossing the intersection; and a controller configured to determine a free zone disposed inside the intersection, by analyzing the entry routes of vehicles crossing the intersection, to ask for consent from a user who is riding in the subject vehicle whether to allow the subject vehicle to drive the free zone, and upon the user's consent, to cause the subject vehicle to autonomously pass the stop line to stop at the determined free zone without passing the intersection so as to allow the emergency vehicle to pass and not to interfere with vehicles crossing the intersection, wherein the free zone is a space disposed inside the intersection and not interfering with driving of vehicles crossing the intersection.

7. The yielding system for emergency vehicles according to claim 6, wherein the sensor detects the emergency vehicle based on one or more of whether a vehicle surrounding the subject vehicle sounds a siren, whether a surrounding vehicle turns on a flashing light, and whether a surrounding vehicle honks a horn thereof.

8. The yielding system for emergency vehicles according to claim 6, wherein the sensor collects lane entry trajectories of vehicles turning left in front of the subject vehicle.

9. The yielding system for emergency vehicles according to claim 6, wherein the controller determines a space between an area outside the stop line where the subject vehicle is stopped and the area that does not interfere with the driving of the vehicles crossing the intersection as the free zone based on the collected entry routes.

10. The yielding system for emergency vehicles according to claim 6, wherein the controller causes the subject vehicle to travel to the free zone only when the user agrees.

* * * * *